United States Patent
Yoshimura et al.

(10) Patent No.: US 12,080,490 B2
(45) Date of Patent: Sep. 3, 2024

(54) ELECTRODE FOIL FOR ELECTROLYTIC CAPACITOR, ELECTROLYTIC CAPACITOR, AND PRODUCTION METHODS THEREFOR

(71) Applicant: Panasonic Intellectual Property Management Co., Ltd., Osaka (JP)

(72) Inventors: Mitsuhisa Yoshimura, Osaka (JP); Naomi Kurihara, Osaka (JP); Miwa Ogawa, Osaka (JP); Yasuhiro Tsuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 408 days.

(21) Appl. No.: 17/396,767

(22) Filed: Aug. 9, 2021

(65) Prior Publication Data

US 2021/0366661 A1 Nov. 25, 2021

Related U.S. Application Data

(63) Continuation of application No. PCT/JP2020/007016, filed on Feb. 21, 2020.

(30) Foreign Application Priority Data

Feb. 28, 2019 (JP) .................................. 2019-037030

(51) Int. Cl.
*H01G 9/07* (2006.01)
*H01G 9/045* (2006.01)
(Continued)

(52) U.S. Cl.
CPC .............. *H01G 9/07* (2013.01); *H01G 9/045* (2013.01); *H01G 9/055* (2013.01); *H01G 9/145* (2013.01); *H01G 9/15* (2013.01)

(58) Field of Classification Search
None
See application file for complete search history.

(56) References Cited

U.S. PATENT DOCUMENTS 11,848,163 B2 * 12/2023 Ogawa ..................... H01G 9/07
2017/0076872 A1 3/2017 Arakawa et al.
(Continued)

FOREIGN PATENT DOCUMENTS

CN 108701548 A 10/2018
JP 2015073015 A * 4/2015
(Continued)

OTHER PUBLICATIONS

English Translation of Chinese Office Action dated Nov. 28, 2022 for the related Chinese Patent Application No.202080017071.6.
(Continued)

*Primary Examiner* — Eric W Thomas
(74) *Attorney, Agent, or Firm* — Rimon P.C.

(57) ABSTRACT

An electrode foil for an electrolytic capacitor includes a metal foil having a porous part, and a dielectric layer covering a surface of a metal framework constituting the porous part. The dielectric layer includes a first layer containing an oxide of a second metal different from a first metal contained in the metal framework. The first layer has a thickness T1. The first layer contains at least one kind of additive element selected from the group consisting of carbon, phosphorus, boron, and nitrogen. The first layer includes a first region from an outer surface of the first layer to a center of the first layer in a thickness direction, and a second region from the center to an inner surface of the first layer. A content of the at least one kind of additive element in the first region is greater than a content of the at least one kind of additive element in the second region.

10 Claims, 5 Drawing Sheets

(51) Int. Cl.
*H01G 9/055* (2006.01)
*H01G 9/145* (2006.01)
*H01G 9/15* (2006.01)

(56) References Cited

U.S. PATENT DOCUMENTS

2018/0158611 A1 6/2018 Arakawa et al.
2018/0358181 A1 12/2018 Ogawa et al.
2021/0366661 A1 11/2021 Yoshimura et al.

FOREIGN PATENT DOCUMENTS

| JP | 2015115475 A | * | 6/2015 |
| WO | 2015/190278 | | 12/2015 |
| WO | 2017/026247 | | 2/2017 |
| WO | 2017/154461 | | 9/2017 |
| WO | 2018/198744 | | 11/2018 |

OTHER PUBLICATIONS

International Search Report of PCT application No. PCT/JP2020/007017 dated May 12, 2020.
Non-Final Office Action dated Apr. 21, 2023 issued in U.S. Appl. No. 17/396,635.
International Search Report of PCT application No. PCT/JP2020/007016 dated Apr. 28, 2020.

* cited by examiner

ELECTRODE FOIL FOR ELECTROLYTIC CAPACITOR, ELECTROLYTIC CAPACITOR, AND PRODUCTION METHODS THEREFOR

RELATED APPLICATIONS

This application is a continuation of the PCT International Application No. PCT/JP2020/007016 filed on Feb. 21, 2020, which claims the benefit of foreign priority of Japanese patent application No. 2019-037030 filed on Feb. 28, 2019, the contents all of which are incorporated herein by reference.

BACKGROUND

1. Technical Field

The present disclosure relates to an electrode foil for an electrolytic capacitor, an electrolytic capacitor, and production methods therefor.

2. Description of the Related Art

For example, a metal foil containing a valve metal is used as an anode body of an electrolytic capacitor. In order to increase the capacitance of the electrolytic capacitor, a main surface of the metal foil is etched to form a porous metal portion. Thereafter, a layer of a metal oxide (dielectric) is formed on a surface of the porous metal portion by performing a chemical conversion treatment on the metal foil.

On the other hand, International Publication No. WO 2017/26247 discloses that a dielectric layer is formed by an atomic layer deposition method.

SUMMARY

An electrode foil for an electrolytic capacitor according to a first aspect of the present disclosure includes a metal foil having a porous part, and a dielectric layer covering a surface of a metal framework constituting the porous part. The dielectric layer includes a first layer containing an oxide of a second metal different from a first metal contained in the metal framework. The first layer has a thickness T1. The first layer contains at least one kind of additive element selected from the group consisting of carbon, phosphorus, boron, and nitrogen. The first layer has an inner surface facing the metal framework, and an outer surface being opposite to the inner surface. The at least one kind of additive element is contained in a region from the outer surface of the first layer to a depth of at least 0.05×T1. The first layer includes a first region from the outer surface to a center of the first layer in a thickness direction, and a second region from the center to the inner surface. A content of the at least one kind of additive element in the first region is greater than a content of the at least one kind of additive element in the second region.

A production method for an electrode foil for an electrolytic capacitor according to a second aspect of the present disclosure includes: preparing a metal foil having a porous part; and forming a dielectric layer covering a surface of a metal framework constituting the porous part. The forming of the dielectric layer includes: (A) forming, on the surface of the metal framework, a first layer containing an oxide of a second metal different from a first metal contained in the metal framework by a gas phase method, the first layer having a thickness T1; and (B) adding at least one kind of additive element selected from the group consisting of carbon, phosphorus, boron, and nitrogen in a region from an outer surface of the first layer to a depth of at least 0.05×T1, the outer surface being opposite to an inner surface facing the metal framework. The first layer includes a first region from the outer surface to a center of the first layer in a thickness direction, and a second region from the center to the inner surface. A content of the at least one kind of additive element in the first region is greater than a content of the at least one kind of additive element in the second region.

An electrolytic capacitor according to a third aspect of the present disclosure includes: an anode body having a porous part; a dielectric layer covering a surface of a metal framework constituting the porous part; and a cathode part covering the dielectric layer. The dielectric layer includes a first layer containing an oxide of a second metal different from a first metal contained in the metal framework. The first layer has a thickness T1. The first layer contains at least one kind of additive element selected from the group consisting of carbon, phosphorus, boron, and nitrogen. The first layer has an inner surface facing the metal framework, and an outer surface facing the cathode part. The at least one kind of additive element is contained in a region from the outer surface of the first layer to a depth of at least 0.05×T1. The first layer includes a first region from the outer surface to a center of the first layer in a thickness direction, and a second region from the center to the inner surface. A content of the at least one kind of additive element in the first region is greater than a content of the at least one kind of additive element in the second region.

A production method for an electrolytic capacitor according to a fourth aspect of the present disclosure includes: preparing an anode body having a porous part; forming a dielectric layer covering a surface of a metal framework constituting the porous part; and forming a cathode part covering the dielectric layer. The forming of the dielectric layer includes: (A) forming, on the surface of the metal framework, a first layer containing an oxide of a second metal different from a first metal contained in the metal framework by a gas phase method, the first layer having a thickness T1; and (B) adding at least one kind of additive element selected from the group consisting of carbon, phosphorus, boron, and nitrogen in a region from an outer surface of the first layer to a depth of at least 0.05×T1, the outer surface facing the cathode part. The first layer includes a first region from the outer surface to a center of the first layer in a thickness direction, and a second region from the center to an inner surface facing the metal framework. A content of the at least one kind of additive element in the first region is greater than a content of the at least one kind of additive element in the second region.

According to the present disclosure, it is possible to obtain an electrolytic capacitor having high acid resistance, and a leakage current of the electrolytic capacitor can be sufficiently suppressed.

DETAILED DESCRIPTION OF EMBODIMENT

Figure 1:
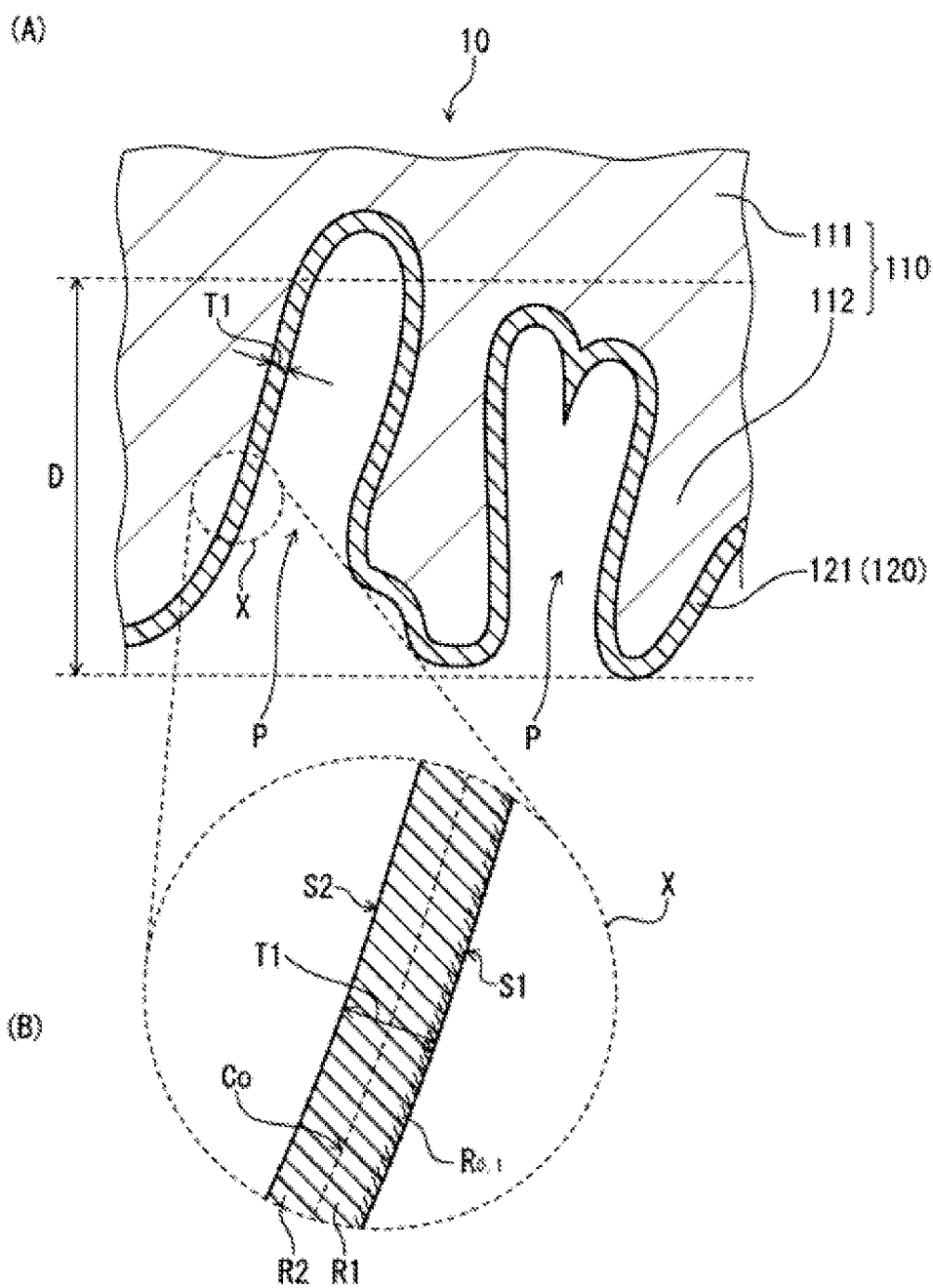
FIG. 1 is an enlarged schematic cross-sectional view illustrating an anode foil according to an exemplary embodiment of the present disclosure, (A) is an enlarged schematic cross-sectional view illustrating a part of a porous part including a dielectric layer, and (B) is an enlarged view of a portion surrounded by a broken line X.

When a dielectric layer is formed by an atomic layer deposition method, acid resistance of the dielectric layer may be insufficient, and a leakage current may not be sufficiently reduced.

An electrode foil for an electrolytic capacitor according to the present exemplary embodiment includes a metal foil having a porous part, and a dielectric layer covering a surface of a metal framework constituting the porous part. An electrolytic capacitor according to the present exemplary embodiment includes the aforementioned metal foil as an anode body and a cathode part covering the dielectric layer. Hereinafter, the anode body or the metal foil having the porous part may be referred to an anode body without distinction.

The anode body is, for example, an integrated product of a core material part and the porous part. The anode body is obtained by, for example, etching a part of the metal foil made of a first metal. Thus, the metal framework contains the first metal. The porous part is a portion of the metal foil that has been made to be porous by etching, and the remaining portion of the metal foil (a portion other than the porous part) is the core material part.

The metal framework refers to a metal portion having a fine structure in the porous part. The porous part has pits or pores surrounded by the metal framework. The dielectric layer is provided so as to cover at least a part of the surface of the metal framework.

The dielectric layer has a first layer having a thickness T1 and containing an oxide of a second metal different from a first metal contained in the metal framework. When the oxide of the second metal different from the first metal is added in the dielectric layer, the second metal having a high dielectric constant, for example, can be selected without being restricted by the first metal. Thus, the capacitance of the electrolytic capacitor is easily improved. Since a range of selection for the second metal is widened, various performances can be imparted to the dielectric layer without being restricted by the first metal.

In the present disclosure, the first layer contains at least one additive element selected from the group consisting of carbon (C), phosphorus (P), boron (B), and nitrogen (N). The additive element is distributed in a region from a surface of the first layer at the cathode part side to a depth of at least $0.05 \times T1$. Hence, sufficient acid resistance can be imparted to the dielectric layer, and thus the leakage current can be sufficiently reduced. The first layer is made of a dielectric containing the oxide of the second metal different from the first metal. Although the dielectric having the high dielectric constant can be formed by using the second metal, a defect in the dielectric layer, which causes an increase in the leakage current, is likely to occur in the formation procedure. By making the additive element enter the defect, the acid resistance is imparted to the dielectric layer, and thus the increase in the leakage current can be suppressed.

Note that even when the additive element is detected in an outermost layer portion from an outer surface of the first layer at the cathode part side to a depth of $0.001 \times T1$, such an additive element is hardly fixed to the dielectric layer, and thus an effect of enhancing the acid resistance or reducing the leakage current can hardly be expected.

When a first region and a second region in the first layer are defined such that the first region is from the outer surface at the cathode part side to a center of the first layer in a thickness direction and the second region is from the center to a surface at the metal framework side, the additive element is contained more in the first region than in the second region. In other words, the additive element is unevenly distributed to a region of the first layer at the cathode part side. A region of the dielectric layer at the cathode part side is easily affected by, for example, an acidic component in an electrolytic solution. Hence, by unevenly distributing the additive element in the first layer at the cathode part side, sufficient acid resistance can be easily imparted to the dielectric layer and the leakage current can be easily reduced. When the additive element is uniformly distributed in the first layer at an amount with which the acid resistance of the dielectric layer can improved and the leakage current can be sufficiently suppressed, the additive element easily act as an impurity so that the capacitance of the electrode foil may be decreased, and the leakage current may be increased.

In the first region, a maximum concentration of the additive element in a region between depth D1 of $0.05 \times T1$ from the outer surface of the first layer at the cathode part side and depth D2 of $0.3 \times T1$ from the outer surface of the first layer at the cathode part side may be twice or more a concentration of the additive element at depth D3 of $0.75 \times T1$ from the outer surface of the first layer at the cathode part side. In this manner, by unevenly distributing the additive element in the first layer at the cathode part side, the acid resistance of the dielectric layer can be more easily improved and the leakage current can be more easily reduced.

In the first region, a maximum concentration of the additive element in a region between depth D1 of $0.05 \times T1$ from the surface of the first layer at the cathode part side and depth D2 of $0.3 \times T1$ from the surface of the first layer at the cathode part side may be three times or more the concentration of the additive element at depth D3 of $0.75 \times T1$ from the surface of the first layer at the cathode part side. In this manner, the acid resistance of the dielectric layer is further improved, and the leakage current is further reduced.

The distribution or concentration of the additive element can be measured by analysis of a cross section of the dielectric layer or the first layer, for example, element mapping using energy-dispersive X-ray spectroscopy (EDX), analysis in a film depth direction by glow-discharge optical emission spectrometry (GD-OES), or the like.

In general, it is difficult to cause the additive element to penetrate up to, for example, the center portion of the first layer. Thus, the concentration of the additive element at the depth of 0.75×T1 from the outer surface of the first layer at the cathode part side is substantially zero. Hence, it is considered that impurities mixed from an atmosphere or the like are detected in the outermost layer part when the concentration of the additive element at the depth of 0.05×T1 from the outer surface of the first layer at the cathode part side is 0.95 to 1.05 times the concentration of the additive element at the depth of 0.75×T1 from the outer surface (that is, when the concentration is substantially the same as that of the outermost layer portion), for example. In this case, it can be regarded that the additive element is not substantially contained in the first layer (that is, the additive element concentration in the first layer is zero as a whole).

A second layer having thickness T2 and containing an oxide of the first metal may be disposed between the metal framework and the first layer. The second layer can be formed, for example, by chemically converting the porous part of the anode body. In this case, a valve metal suitable for chemical conversion is preferably used as the first metal. The second layer may contain a composite oxide of an oxide of the first metal and an oxide of the second metal. Even when there is a defect in the first layer, the defect can be repaired by forming the second layer. Thus, the acid resistance of the dielectric layer is further improved, and the leakage current is further reduced.

Thickness T1 of the first layer and thickness T2 of the second layer may satisfy T1>2×T2 or T1>3×T2. By making the thickness of the first layer to be relatively large in this manner when the second metal having the high dielectric constant is used, the capacitance of the electrolytic capacitor can be remarkably improved, for example.

The first metal may include, for example, aluminum (Al). At this time, the second metal may include, for example, at least one selected from the group consisting of tantalum (Ta), niobium (Nb), titanium (Ti), silicon (Si), zirconium (Zr), and hafnium (Hf).

The electrode foil for an electrolytic capacitor is produced, for example, by a method including (i) a step of preparing the metal foil having the porous part, and (ii) a step of forming the dielectric layer covering the surface of the metal framework constituting the porous part. The electrolytic capacitor is produced by a method including (iii) a step of forming the cathode part covering the dielectric layer in addition to steps (i) and (ii) described above.

Step (i)

The step (i) of preparing the metal foil (anode body) having the porous part may be, for example, a step of roughening the metal foil by etching the metal foil containing the first metal. A plurality of pits or pores are formed on the surface of the metal foil by roughening. The etching can be performed by, for example, direct current etching using direct current or alternating current etching using alternating current.

Although a kind of the first metal is not particularly limited, a valve metal such as aluminum (Al), tantalum (Ta), or niobium (Nb), or an alloy containing the valve metal can be used from the viewpoint of easily forming the second layer by a chemical conversion. Copper (Cu) may be contained in the metal foil in order to effectively form the porous part. A thickness of the metal foil is not particularly limited, and is, for example, in a range from 15 μm to 400 μm, inclusive.

A pore diameter of the pit or pore formed on the surface of the metal foil is not particularly limited, but may be, for example, in a range from 50 nm from 2000 nm, inclusive, from the viewpoint of increasing a surface area and forming the dielectric layer up to a deep portion of the porous part. The pore diameter is a most frequent pore diameter of a pore distribution measured by, for example, a mercury porosimeter. A thickness of the porous part is not particularly limited, and may be appropriately set in accordance with the thickness of the metal foil, but may be, for example, in a range from 1/10 to 4/10, inclusive, of the thickness of the anode body. A thickness D of the porous part may be obtained as an average value of any ten points in an electron micrograph of a cross section of the anode body. Hereinafter, a thickness of the dielectric layer, that is, the thicknesses of the first layer and the second layer can be similarly calculated.

Step (ii)

The step (ii) of forming the dielectric layer includes, for example, (A) step of forming, on the surface of the metal framework, the first layer having thickness T1 and containing the oxide of the second metal different from the first metal by a gas phase method.

Examples of the second metal include aluminum (Al), tantalum (Ta), niobium (Nb), silicon (Si), titanium (Ti), zirconium (Zr), and hafnium (Hf). These metal may be used singly or in combination of two or more kinds thereof. That is, the first layer may contain $Al_2O_3$, $Ta_2O_5$, $Nb_2O_5$, $SiO_2$, $TiO_2$, $ZrO_2$, $HfO_2$, or the like singly or two or more kinds thereof. When the first layer contains two or more kinds of oxides of the second metal, two or more kinds of oxides may be mixed, or each of the oxides may be disposed in a layer. From the viewpoint of increasing the capacitance of the electrolytic capacitor, the oxide of the second metal preferably has a higher relative dielectric constant than the oxide of the first metal. From the viewpoint of improving a withstand voltage of the electrolytic capacitor, the second metal is preferably tantalum (Ta), titanium (Ti), silicon (Si), or the like.

As the gas phase method, for example, a vacuum vapor deposition method, a chemical vapor deposition method, a mist vapor deposition method, a sputtering method, a pulsed laser deposition method, an atomic layer deposition method (ALD method), or the like can be selected. Among these methods, the ALD method is excellent in view of being enable to form a dense dielectric layer up to the deep portion of the porous part. The thickness of the first layer is not particularly limited, and may be, for example, in a range from 0.5 nm to 200 nm, inclusive, or a range from 5 nm to 100 nm, inclusive.

FIG. 1 illustrates an example of anode foil 10 including anode body 110 that is an integrated product of core material part 111 and porous part 112, and dielectric layer 120 that covers a surface of a metal framework constituting porous part 112. (A) of FIG. 1 is an enlarged schematic cross-sectional view illustrating a part of porous part 112 having only first layer 121 as dielectric layer 120.

As illustrated in (A) of FIG. 1, porous part 112 has a large number of pits (or pores) P surrounded by the metal framework. Dielectric layer 120 (first layer 121) is disposed so as to cover at least a part of the surface of the metal framework. First layer 121 contains an oxide of a second metal different from the first metal contained in the metal framework, and a thickness is indicated by T1.

An ALD method is a film formation method for forming the dielectric layer (first layer) containing the oxide of the second metal on a surface of an object by alternately supplying a raw material gas containing the second metal and an oxidizing agent to a reaction chamber in which the object is disposed. In the ALD method, since a self-limiting action functions, the second metal is deposited on the surface of the object in units of atomic layers. Thus, the thickness of the first layer is controlled by a number of cycles in which supply of raw material gas→exhaust (purge) of raw material gas→supply of oxidizing agent→exhaust (purge) of oxidizing agent is taken as one cycle. That is, the ALD method can easily control the thickness of the dielectric layer to be formed.

The ALD method can be performed under a condition of a temperature range from 100° C. to 400° C., inclusive, as compared with a condition of a temperature range from 400° C. to 900° C., inclusive, under which CVD generally is performed. That is, the ALD method is excellent in view of being enable to suppress a thermal damage to the metal foil.

Examples of the oxidizing agent used in the ALD method include water, oxygen, and ozone. The oxidizing agent may be supplied to the reaction chamber as plasma using the oxidizing agent as a raw material.

The second metal is supplied to the reaction chamber as a gas of a precursor containing the second metal. The precursor is, for example, an organometallic compound containing the second metal, and thus, the second metal is easily chemically adsorbed to the object. In the related art, various organometallic compounds used in the ALD method can be used as the precursor.

Examples of the precursor containing aluminum include trimethylaluminum ($(CH_3)_3Al$). Examples of the precursor containing Zr include bis(methyl-$\eta^5$-cyclopentadienyl) methoxymethyl zirconium ($Zr(CH_3C_5H_4)_2CH_3OCH_3$), tetrakis (dimethylamide) zirconium (IV) ($[(CH_3)_2N]_4Zr$), tetrakis(ethylmethylamide) zirconium (IV) ($Zr(NCH_3C_2H_5)_4$), and zirconium (IV) t-butoxide ($Zr[OC(CH_3)_3]_4$). Examples of the precursor containing Nb include niobium (V) ethoxide ($Nb(OCH_2CH_3)_5$, and tris(diethylamide)(t-butylimide) niobium (V) ($C_{16}H_{39}N_4Nb$).

Examples of the precursor containing tantalum include (t-butylimide) tris(ethylmethylamino) tantalum (V) ($C_{13}H_{33}N_4Ta$, TBTEMT), tantalum (V) pentaethoxide (Ta$(OC_2H_5)_5$), (t-butylimide) tris(diethylamino) tantalum (V) ($(CH_3)_3CNTa(N(C_2H_5)_2)_3$), and pentakis(dimethylamino) tantalum (V) ($T_a(N(CH_3)_2)_5$).

Examples of the precursor containing niobium include niobium (V) ethoxide ($Nb(OCH_2CH_3)_5$, and tris(diethylamide) (t-butylimide) niobium (V) ($C_{16}H_{39}N_4Nb$).

Examples of the precursor containing silicon include N-sec-butyl (trimethylsilyl) amine ($C_7H_{19}NSi$), 1,3-diethyl-1,1,3,3-tetramethyldisilazane ($C_8H_{23}NSi_2$), 2,4,6,8,10-pentamethylcyclopentasiloxane ($(CH_3SiHO)_5$), pentamethyldisilane ($(CH_3)_3SiSi(CH_3)_2H$), tris(isopropoxy) silanol ($[(H_3C)_2CHO]_3SiOH$), chloropentamethyldisilane ($(CH_3)_3SiSi(CH_3)_2Cl$), dichlorosilane ($SiH_2Cl_2$), tridimethylaminosilane ($Si[N(CH_3)_2]_4$), tetraethylsilane ($Si(C_2H_5)_4$), tetramethylsilane ($Si(CH_3)_4$), tetraethoxysilane ($Si(OC_2H_5)_4$), dodecamethylcyclohexasilane ($(Si(CH_3)_2)_6$), silicon tetrachloride ($SiCl_4$), and silicon tetrabromide ($SiBr_4$).

Examples of the precursor containing titanium include bis(t-butylcyclopentadienyl) titanium (IV) dichloride ($C_{18}H_{26}Cl_2Ti$) tetrakis(dimethylamino) titanium (IV) ($[CH_3)_2N]_4Ti$, TDMAT), tetrakis(diethylamino) titanium (IV) ($[(C_2H_5)_2N]_4Ti$) tetrakis (ethylmethylamino) titanium (IV) ($Ti[N(C_2H_5)(CH_3)]_4$), titanium (IV) (diisopropoxide-bis(2,2,6,6-tetramethyl-3,5-heptanedionate ($Ti[OCC(CH_3)_3CHCOC(CH_3)_3]_2(OC_3H_7)_2$), titanium tetrachloride ($TiCl_4$), titanium (IV) isopropoxide ($Ti[OCH(CH_3)_2]$ 4), and titanium (IV) ethoxide ($Ti[O(C_2H_5)]_4$).

Examples of the precursor containing zirconium include bis(methyl-$\eta^5$cyclopentadienyl) methoxymethyl zirconium ($Zr(CH_3C_5H_4)_2CH_3OCH_3$), tetrakis(dimethylamide) zirconium (IV) ($[(CH_3)_2N]_4Zr$), tetrakis(ethylmethylamide) zirconium (IV) ($Zr(NCH_3C_2H_5)_4$), and zirconium (IV) t-butoxide ($Zr[OC(CH_3)_3]_4$).

Examples of the precursor containing hafnium include hafnium tetrachloride ($HfCl_4$), tetrakis dimethylamino hafnium ($Hf[N(CH_3)_2]_4$), tetrakis ethylmethyl amino hafnium ($Hf[N(C_2H_5)(CH_3)]_4$), tetrakis diethylamino hafnium ($Hf[N(C_2H_5)_2]_4$), and hafnium t-butoxide ($Hf[OC(CH_3)_3]_4$).

Next, the step (ii) of forming the dielectric layer includes (B) step of adding at least one kind of additive element selected from the group consisting of carbon, phosphorus, boron, and nitrogen in a region from the outer surface of the first layer to the depth of at least 0.05×T1. The outer surface of the first layer is located at a side opposite to the metal framework. Meanwhile, in the step (B), when the first region and the second region in the first layer are defined such that the first region is from the outer surface to the center of the first layer in the thickness direction and the second region from the center to the surface at the metal framework side, the additive element is added more in the first region than in the second region.

The step (B) may include heating the first layer to 180° C. or higher after the additive element adheres to the first layer. By heating, the additive element adhering to the oxide of the second metal is fixed to the first layer with a larger amount, and appropriately diffuses to a deeper portion of the first layer. In order to attach the additive element to the first layer, for example, the anode body having the dielectric layer may be immersed in an aqueous solution containing the additive element. The additive element may adhere to the anode body having the dielectric layer by the gas phase method such as vapor deposition. In order to further diffuse the additive element, the heating temperature is preferably 250° C. or higher.

The aqueous solution containing the additive element may be an aqueous solution of a compound containing the additive element, and for example, a carboxylic acid containing carbon (C) such as oxalic acid, malonic acid, adipic acid, succinic acid, glutaric acid, sebacic acid, or tartaric acid, a compound containing nitrogen (N) such as ammonium salt such as diammonium adipate, a compound containing phosphorus (P) such as phosphoric acid, ammonium phosphate, phosphonic acid, or phosphinic acid, a compound containing boron (B) such as boric acid or ammonium borate, or the like can be used.

The step (B) of adding the additive element in the first layer may include applying a voltage to the anode body having the first layer in the aqueous solution containing the additive element (or the aqueous solution of the compound containing the additive element) and then heating the first layer to 180° C. or higher. The voltage is applied to the anode body in the aqueous solution, and thus, the additive element is more firmly fixed to the oxide of the second metal contained in the first layer. The additive element is likely to be unevenly distributed in proximity to the surface at a side opposite to the first metal portion. In order to shorten a time for unevenly distributing the additive element in the first layer, it is preferable to heat the first layer by setting a peak temperature to 250° C. or higher and further to 300° C. or higher.

Here, (B) of FIG. 1 is an enlarged view of a portion surrounded by broken line X in (A) of FIG. 1. The additive element is distributed at least in a region (that is, cathode proximity region $R_{0.1}$) from outer surface S1 of first layer 121 at the cathode part side to a depth of $0.05 \times T1$. When first region R1 and second region R2 in first layer 121 is defined such that first region R1 is from outer surface S1 at the cathode part side to the center of first layer 121 in the thickness direction and second region R2 is from the center to surface S2 at the metal framework side, the additive element is contained more in first region R1 than in second region R2. In (B) of FIG. 1, the center of first layer 121 in the thickness direction is indicated by center line Co.

The method for producing the electrode foil for an electrolytic capacitor may further include a step of chemically converting (anodizing) the anode body having the first layer. Accordingly, the second layer, which has thickness T2 and contains the oxide of the first metal, can be formed between the metal framework and the first layer containing the oxide of the second metal. The metal framework contains the first metal. Thickness T2 can be controlled by the voltage applied to the anode body at the time of chemical conversion.

Figure 2:
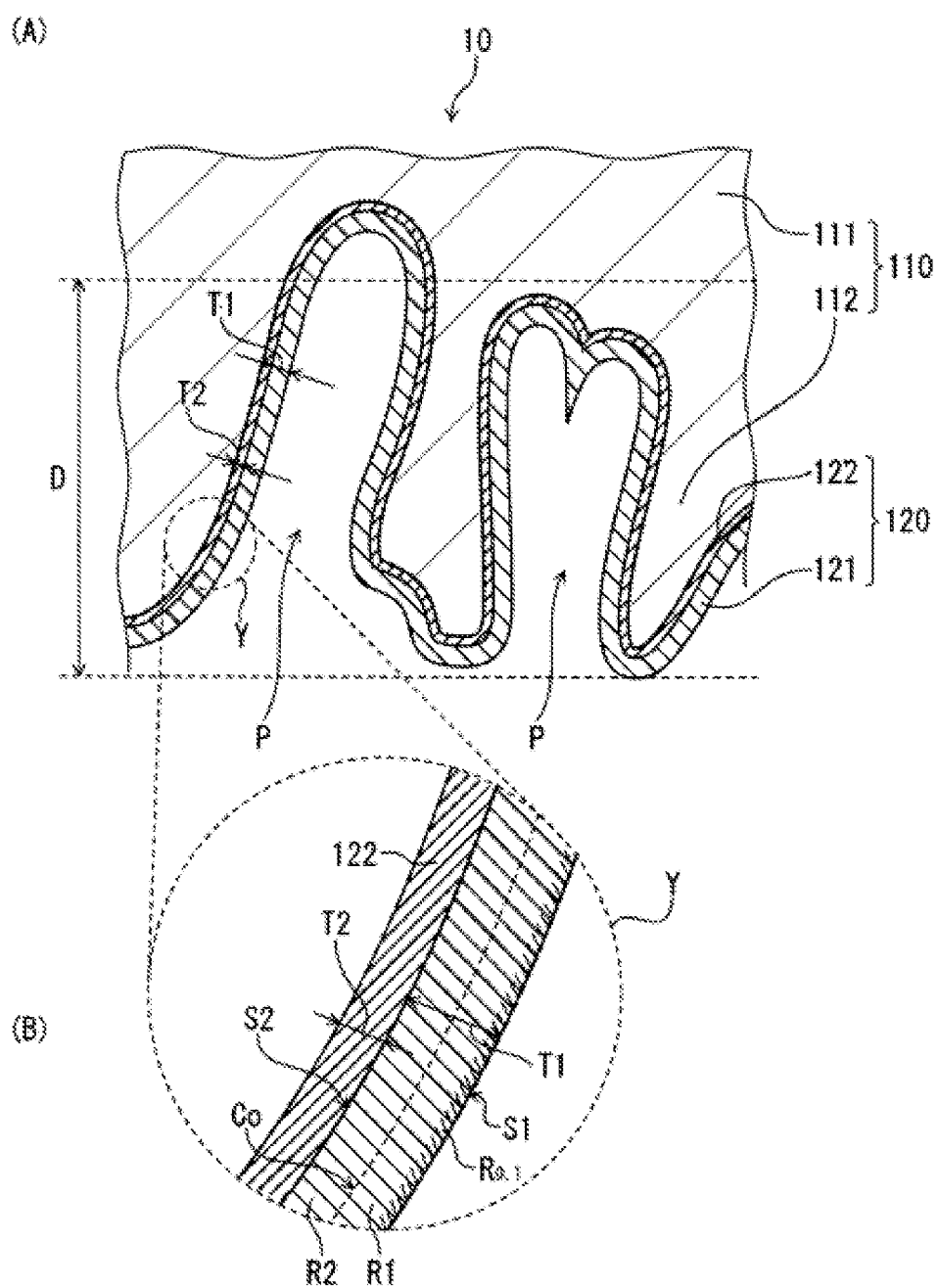
FIG. 2 is an enlarged schematic cross-sectional view illustrating an anode foil according to another exemplary embodiment of the present disclosure, (A) is an enlarged schematic cross-sectional view illustrating a part of a porous part including a dielectric layer, and (B) is an enlarged view of a portion surrounded by a broken line Y.

(A) of FIG. 2 is an enlarged schematic cross-sectional view illustrating a part of porous part 112 having, as dielectric layer 120, first layer 121 and second layer 122. (B) of FIG. 2 is an enlarged view of a portion surrounded by broken line Y in (A) of FIG. 2. In FIG. 2, constituent elements corresponding to those in FIG. 1 are denoted by the same reference signs as those in FIG. 1.

As illustrated in (A) of FIG. 2, dielectric layer 120 includes second layer 122 and first layer 121 in this order from the metal framework side. The thickness of first layer 121 is indicated by T1, and the thickness of the second layer is indicated by T2. Here, the additive element is distributed at least in cathode proximity region $R_{0.1}$ from surface S1 of first layer 121 at the cathode part side to the depth of $0.05 \times T1$, and is contained more in first region R1 than in second region R2 of first layer 121.

According to the ALD method, a thin and uniform dielectric layer (first layer) can be formed. However, actually, the surface of the deep portion of the pit included in the porous part may have a macroscopic defect such as a pinhole or a fine defect such as a lattice defect. When the second layer is formed, the ionized first metal diffuses to the first layer, and thus, an action of repairing the defect of the first layer is achieved. As a result, a dielectric layer having a uniform thickness with a reduced defect such as a pinhole is formed as a whole. Thus, the capacitance of the electrolytic capacitor is increased, and the withstand voltage is improved because the natural potential of the anode body is increased.

Thickness T2 of the second layer is not particularly limited, but may be smaller than thickness T1 of the first layer. Thickness T2 of the second layer is in a range, for example, from 0.5 nm to 200 nm, inclusive, and may be in a range, for example, from 5 nm to 100 nm, inclusive.

A ratio of thickness T1 of the first layer to thickness T2 of the second layer is not particularly limited, and may be appropriately set in accordance with an application, a desired effect, and the like. For example, the ratio of thickness (T1/T2) may be 1 or more, 2 or more, 3 or more, or 5 or more.

Here, when three regions equally divided in the porous part are defined such that the three regions of a first region, a second region, and a third region are disposed in order from a side close to a metal core part in a thickness direction of the porous part, porosity P1 of the first region, porosity P2 of the second region, and porosity P3 of the third region preferably satisfy $P1<P2<P3$. That is, the porosity of the porous part is increased toward the outer surface of the anode body. In this case, it is further facilitated to add a sufficient amount of additive element to the first layer. When the above relationship is satisfied, the entrance of the pit is hardly blocked by the dielectric layer, and the penetration of the additive element into the porous part proceeds well.

On the other hand, in the deep portion (for example, the first region) of the porous part, the porosity is relatively low, and a pit diameter (or pore diameter) of an etching pit is relatively small. In other words, there are many fine pores in the deep portion of the porous part, and a large surface area is secured. Thus, even when the surface area in a region proximity to the outer surface of the anode body (for example, the third region) is relatively small, a sufficiently large electrostatic capacitance can be easily secured.

The porosity of the porous part may be measured by the following method. First, the anode body is cut so as to obtain a cross section of the metal core part and the porous part of the anode body in the thickness direction, and an electron micrograph of the cross section is captured. Subsequently, an image is binarized to distinguish between the metal framework and voids. Next, the image is divided into a plurality of parts (for example, 0.1 μm intervals) along a path parallel to the thickness direction of the anode body from the surface side toward the metal core part side, and an average value of the porosities of the divided parts is calculated as the porosity. The calculated value is used, and thus, a graph representing a relationship between a distance from the surface of the anode body and the porosity can be drawn. In the first region, the second region, and the third region, a plurality of porosities at any positions may be extracted at equal intervals, and P1, P2, and P3 may be calculated from an average value thereof.

P2 and P3 may satisfy $P2 \times 1.1 \leq P3$, or may satisfy $P2 \times 1.2 \leq P3$. P1 and P2 may satisfy $P1 \times 1.05 \leq P2$, or may satisfy $P1 \times 1.1 \leq P2$.

P1 to P3 may satisfy $P2/P1<P3/P2$, $1.05 \times P2/P1<P3/P2$, and may satisfy $1.3 \times P2/P1<P3/P2$. P1 may be, for example, 30% or more. P2 may be, for example, 40% or more, and may be 50% or more. P3 may be 60% or more. In this case, when the dielectric layer is formed by the gas phase method such as the atomic layer deposition method, the diffusibility of the raw material gas of the dielectric layer to the deep portion of the metal porous part is improved. However, from the viewpoint of securing sufficient strength of the anode body, P3 is preferably 80% or less, P2 is preferably 70% or less, and P1 is preferably 60% or less.

Step (iii)

In the step (iii) of forming the cathode part covering the dielectric layer, for example, the anode body having the dielectric layer may be impregnated with the electrolytic solution, and/or a solid electrolyte layer may be formed on the surface of the dielectric layer. When both the formation of the solid electrolyte layer and the impregnation of the electrolytic solution are performed, the impregnation of the electrolytic solution may be performed after forming the solid electrolyte layer on the dielectric layer.

The electrolytic solution may be a nonaqueous solvent, or may be a mixture of a nonaqueous solvent and an ionic substance (solute (for example, organic salt)) dissolved in the nonaqueous solvent. The nonaqueous solvent may be an organic solvent or an ionic liquid.

The nonaqueous solvent is preferably a high boiling point solvent. Examples of the nonaqueous solvent include polyhydric alcohols such as ethylene glycol and propylene glycol, cyclic sulfones such as sulfolane, lactones such as γ-butyrolactone, amides such as N-methylacetamide, N,N-dimethylformamide, and N-methyl-2 pyrrolidone, esters such as methyl acetate, carbonate compounds such as propylene carbonate, ethers such as 1,4-dioxane, ketones such as methyl ethyl ketone, and formaldehyde.

The organic salt is salt in which at least one of an anion and a cation contains an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2 ethylimidazolinium phthalate.

The solid electrolyte layer contains, for example, a manganese compound, a conductive polymer, and the like. Polypyrrole, polythiophene, polyaniline, derivatives thereof, and the like can be used as the conductive polymer. The solid electrolyte layer containing the conductive polymer can be formed by, for example, chemical polymerization and/or electrolytic polymerization of a raw material monomer on the dielectric layer. The solid electrolyte layer may be formed by attaching a solution in which the conductive polymer is dissolved or a dispersion liquid in which the conductive polymer is dispersed to the dielectric layer.

Figure 4:
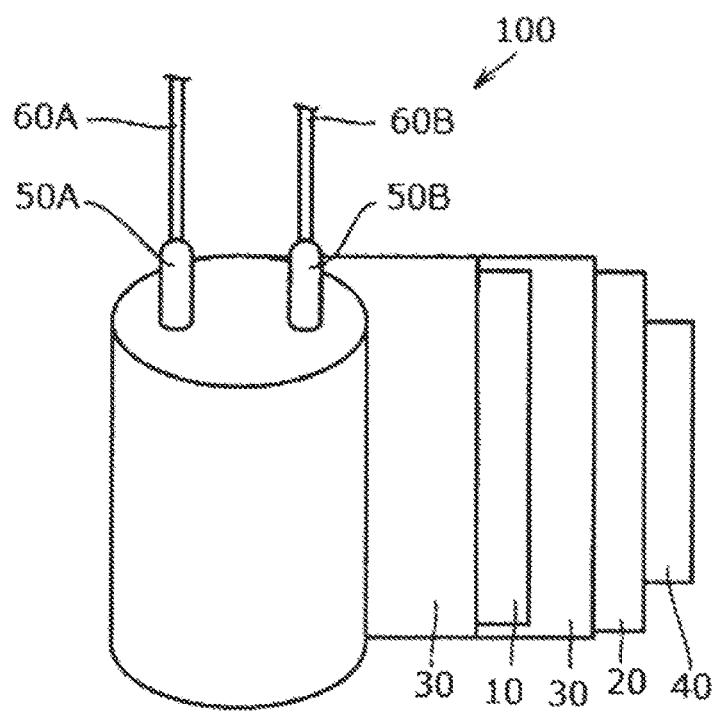
FIG. 4 is a perspective view schematically illustrating a configuration of a wound body included in the electrolytic capacitor.

When the anode body having the dielectric layer is the anode foil illustrated in FIGS. 1 and 2, wound body 100 illustrated in FIG. 4 may be prepared before the cathode part is formed. FIG. 4 is a developed view for describing a configuration of wound body 100.

When wound body 100 is prepared, cathode foil 20 is prepared in addition to anode foil 10. A metal foil can be used for cathode foil 20 in the same manner as anode foil 10. A kind of the metal forming cathode foil 20 is not particularly limited, but a valve metal such as aluminum (Al), tantalum (Ta), or niobium (Nb), or an alloy containing the valve metal can be used. A surface of cathode foil 20 may be roughened as necessary.

Subsequently, anode foil 10 and cathode foil 20 are wound with separator 30 interposed therebetween. One ends of lead tabs 50A and 50B are respectively connected to anode foil 10 and cathode foil 20, and wound body 100 is formed while lead tabs 50A and 50B are wound. Lead wires 60A and 60B are connected to the other ends of lead tabs 50A and 50B, respectively.

Separator 30 is not particularly limited, and for example, nonwoven fabric containing cellulose, polyethylene terephthalate, vinylon, aramid fiber, or the like as a main component can be used.

Subsequently, winding stop tape 40 is disposed on an outer surface of cathode foil 20 positioned at an outermost layer of wound body 100, and an end of cathode foil 20 is fixed with winding stop tape 40. When anode foil 10 is prepared by cutting a large foil, a chemical conversion treatment may further be performed on wound body 100 in order to provide the dielectric layer on the cutting surface.

A method for impregnating wound body 100 with the electrolytic solution, the solution in which the conductive polymer is dissolved, and/or the dispersion in which the conductive polymer is dispersed is not particularly limited. For example, a method for immersing wound body 100 in the electrolytic solution, the solution, or the dispersion stored in a container, a method for dropping the electrolytic solution, the solution, or the dispersion on wound body 100, or the like can be used. The wound body may be impregnated under a reduced pressure in an atmosphere of a range, for example, from 10 kPa to 100 kPa, inclusive, preferably a range from 40 kPa to 100 kPa, inclusive.

Figure 3:
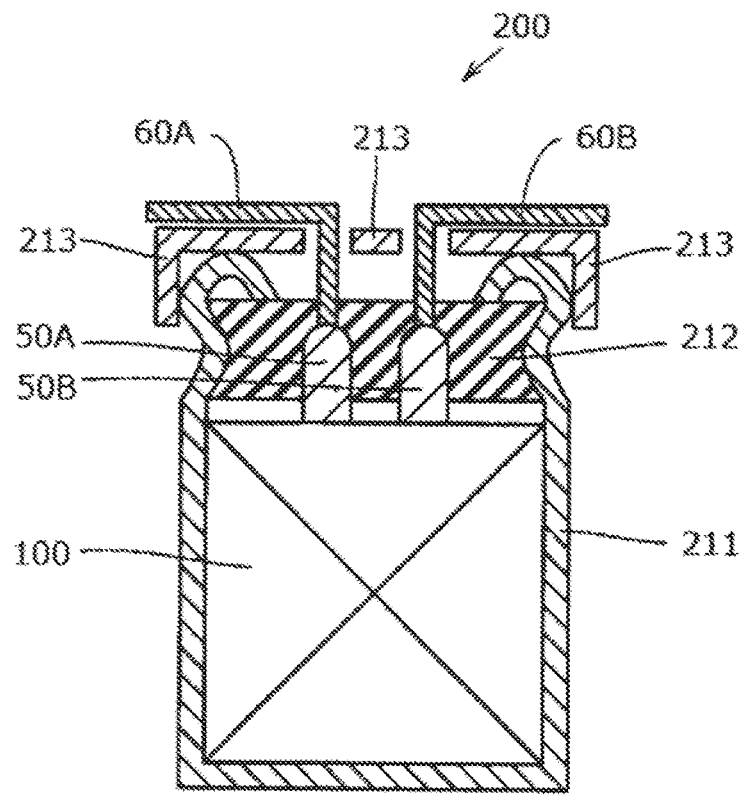
FIG. 3 is a schematic cross-sectional view illustrating an electrolytic capacitor.

Subsequently, electrolytic capacitor 200 illustrated in FIG. 3 is obtained by sealing wound body 100. In order to produce electrolytic capacitor 200, first, wound body 100 is housed in bottomed case 211 such that lead wires 60A and 60B are positioned on an opening side of bottomed case 211. Metal such as aluminum, stainless steel, copper, iron, or brass, or an alloy thereof can be used as a material of bottomed case 211.

Subsequently, sealing member 212 formed so as to let lead wires 60A and 60B penetrate is disposed above wound body 100, and wound body 100 is sealed in bottomed case 211. Sealing member 212 may be an insulating substance, and is preferably an elastic body. Among these materials, silicone rubber, fluororubber, ethylene propylene rubber, Hypalon™ rubber, butyl rubber, isoprene rubber, and the like having high heat resistance are preferable.

Subsequently, lateral drawing is performed on bottomed case 211 in a vicinity of an opening end, and curling is performed by swaging the opening end in sealing member 212. Finally, sealing is completed by disposing base plate 213 on the curled portion. Thereafter, an aging treatment may be performed while a rated voltage is applied.

In the above exemplary embodiment, although the wound electrolytic capacitor has been described, an application range of the present disclosure is not limited to the above wound electrolytic capacitor, and the present disclosure can also be applied to other electrolytic capacitors, for example, stacked electrolytic capacitors.

Hereinafter, the present disclosure will be described in more detail based on examples, but the present disclosure is not limited to the examples.

Example 1

In the present example, an electrode foil for an aluminum electrolytic capacitor having a chemical conversion voltage of 65 V was prepared. Hereinafter, a specific method for producing the electrode foil for an electrolytic capacitor will be described.

(Preparation of Anode Foil)

An aluminum foil having a thickness of 120 μm was prepared. A porous part was formed by roughening a surface of the aluminum foil through performing an alternating current etching treatment in an aqueous solution obtained by adding sulfuric acid to hydrochloric acid. A porous part having a thickness of 40 μm was formed on a surface of the aluminum foil, and a pore diameter of the pit was in a range from 100 nm to 200 nm, inclusive.

Porosity P1 of first region R1, porosity P2 of second region R2, and porosity P3 of third region R3 were 50%, 55%, and 70%, respectively, and satisfied P1<P2<P3. P2/P1=1.10 and P3/P2=1.27 were satisfied, and P2/P1<P3/P2 was satisfied. An electrode foil was prepared in the same manner as in the exemplary embodiment except for using this anode body, and was evaluated in the same manner.

Subsequently, an oxide containing tantalum as a dielectric layer (first layer) was formed on a surface of an aluminum framework constituting the porous part by the ALD method (temperature: 200° C., precursor: (t-butylimide) tris(ethylmethylamino) tantalum (V) ($C_{13}H_{33}N_4Ta$, TBTEMT), oxidizing agent: $H_2O$, pressure: 10 Pa, 3000 cycles).

Subsequently, an electrode foil was obtained by performing a chemical conversion treatment on the aluminum foil and forming a second layer containing an oxide of aluminum between the aluminum framework and the first layer. The chemical conversion treatment was performed by immersing the aluminum foil having the first layer in a diammonium adipate aqueous solution (ammonium adipate concentration: 10 mass %) and applying a voltage of 65 V to the aluminum foil. As for a time of applying the voltage after reaching the chemical conversion voltage of about 65 V, the chemical conversion was performed under two conditions of 5 minutes (Example 1A) and 15 minutes (Example 1B). Thereafter, the electrode foil was heated in air at 250° C. for 10 minutes, and nitrogen derived from ammonium ions and carbon derived from adipic acid were introduced as additive elements into a dielectric layer. Thereafter, the electrode foil was cut into a predetermined shape.

As a result of elemental analysis by GD-OES, $Ta_2O_5$ was contained in the first layer (thickness: about 80 nm), and $Al_2O_3$ was contained in the second layer (thickness: about 10 nm) (T1=8×T2). Meanwhile, a boundary portion between the first layer and the second layer was a mixed layer of $Ta_2O_5$ and $Al_2O_3$.

A maximum concentration of nitrogen (N) as the additive element in a region between depth D1 of 0.05×T1 from the outer surface of the first layer at a side opposite and the metal framework to depth D2 of 0.3×T1 from the outer surface of the first layer at a side opposite to the metal framework was two times or more a concentration of nitrogen (N) at depth D3 of 0.75×T1 from the outer surface of the first layer.

Figure 5:
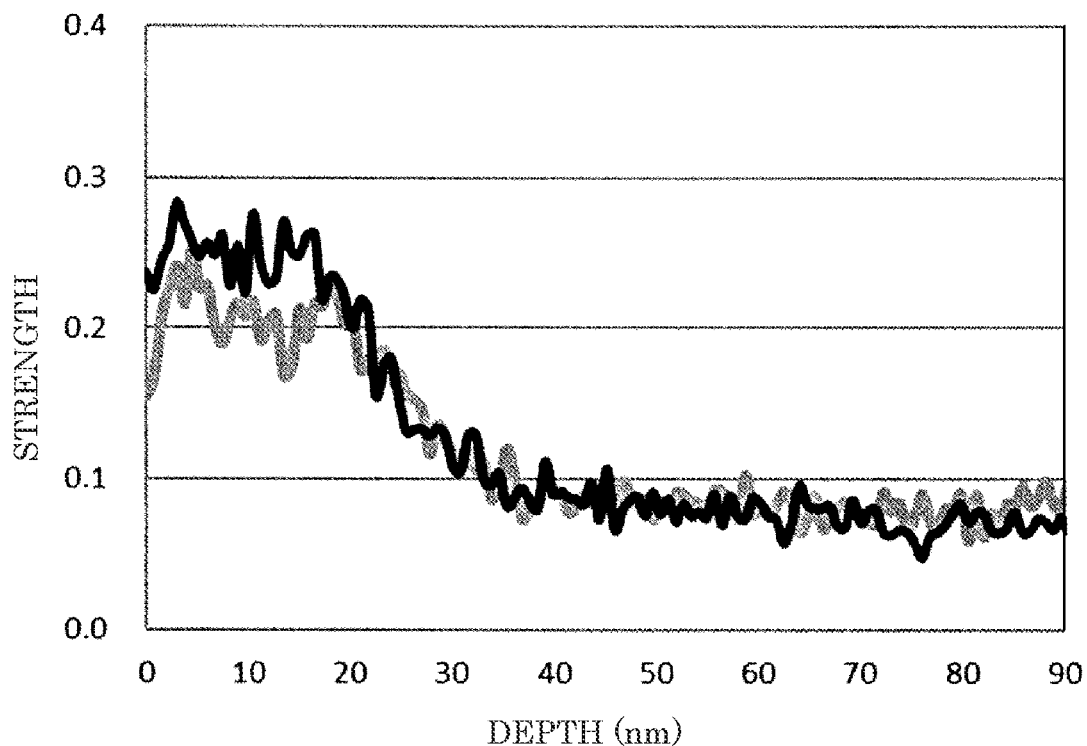
FIG. 5 is a graph showing a relationship between a distance from an outer surface and a content of nitrogen as an additive element in the dielectric layer according to Example 1 of the present disclosure.
Figure 6:
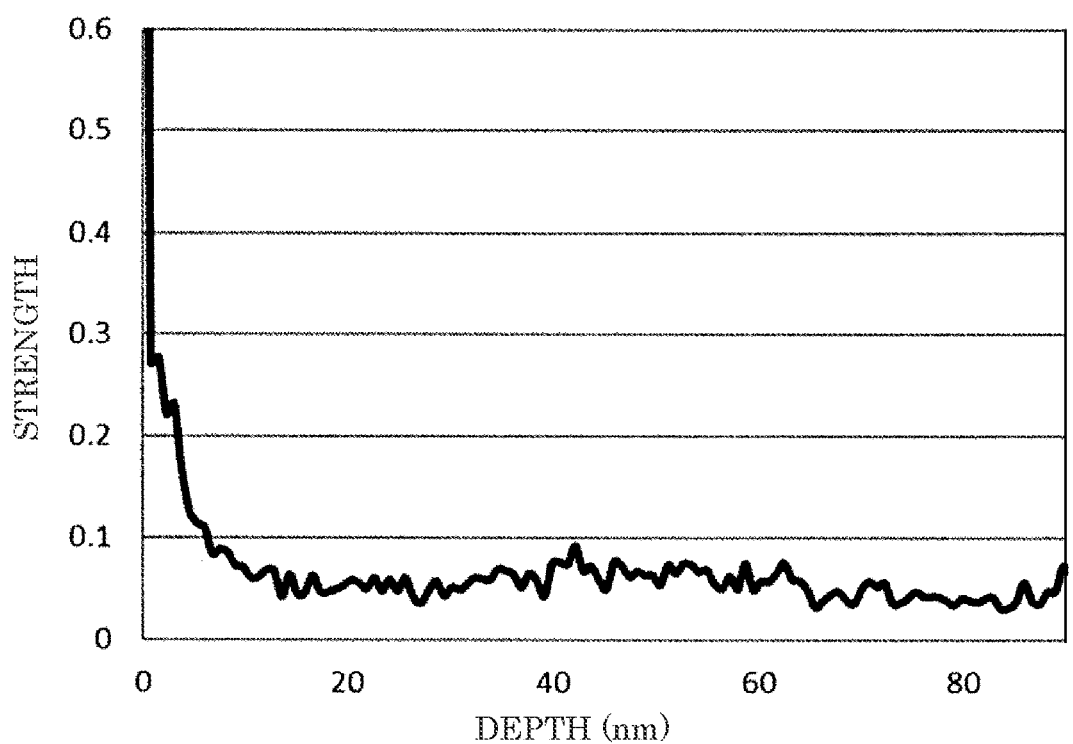
FIG. 6 is a graph showing a relationship between a distance from an outer surface and a content of carbon as an additive element in the dielectric layer according to Example 1 of the present disclosure.

FIG. 5 illustrates a relationship between a distance (depth) from the surface of the first layer at the cathode part side and a content of a nitrogen element. From FIG. 5, it can be confirmed that the nitrogen element is unevenly distributed in the cathode proximity region of the first layer. FIG. 6 illustrates a relationship between a distance (depth) from the outer surface of the first layer and a content of a carbon element. From FIG. 6, it can be confirmed that the carbon element is unevenly distributed in the cathode proximity region of the first layer. When a retention time for applying the chemical conversion voltage of 65 V to introduce nitrogen was 5 minutes (Example 1A), nitrogen was detected. And when the retention time was increased to 15 minutes (Example 1B), the amount of nitrogen was increased.

[Evaluation]

An electrostatic capacitance and a leakage current of the obtained electrode foil were measured. For the leakage current, a voltage was applied while the voltage was increased at a rate of 0.2 V/sec, and an integrated value of the leakage current flowing to 60 V was measured. As the acid resistance (deterioration test), after the electrode foil was immersed (deteriorated) in an acidic aqueous solution at 35° C. for 60 minutes, the leakage current was measured by the same measurement method as described above, and the acid resistance was evaluated. The evaluation results are represented in Table 1. Table 1 represents each relative value when a result of Comparative Example 1 is 100.

Comparative Example 1

After a second layer containing an oxide of aluminum was formed between an aluminum framework and a first layer, an electrode foil was sufficiently washed with distilled water. Thereafter, the electrode foil was cut into a predetermined shape. Except for this point, an electrolytic capacitor was prepared in the same manner as in Example 1.

Example 2

When a second layer containing an oxide of aluminum was formed between the aluminum framework and the first layer, a chemical conversion treatment was performed by immersing an aluminum foil having a first layer in a positive phosphoric acid aqueous solution (positive phosphoric acid concentration: 0.05 mass %) and applying a voltage of 65 V to the aluminum foil. Thereafter, the aluminum foil was heated in air at 250° C. for 15 minutes, and phosphorus derived from phosphate ions was introduced as an additive element into the dielectric layer. Thereafter, the anode foil was cut into a predetermined shape.

As a result of elemental analysis by GD-OES, $Ta_2O_5$ was contained in the first layer (thickness: about 80 nm), and $Al_2O_3$ was contained in the second layer (thickness: about 10 nm) (T1=8×T2).

A maximum concentration of phosphorus (P) as the additive element in a region between depth D1 of 0.05×T1 from the outer surface of the first layer and depth D2 of 0.3×T1 from the outer surface of the first layer was eighteen times or more the concentration of phosphorus (P) at depth D3 of 0.75×T1 from the outer surface of the first layer.

Figure 7:
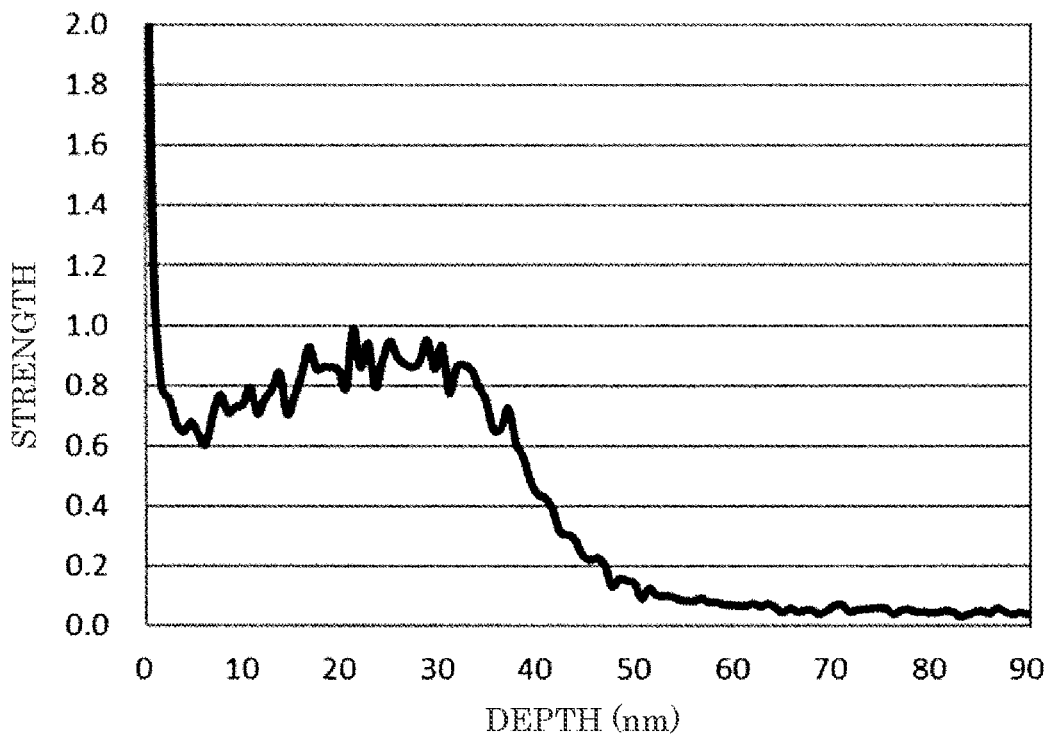
FIG. 7 is a graph showing a relationship between a distance from an outer surface and a content of phosphorus as an additive element in a dielectric layer according to Example 2 of the present disclosure.

FIG. 7 represents a relationship between a distance (depth) from the outer surface of the first layer and a content of a phosphorus element. From FIG. 7, it can be confirmed that the phosphorus element is unevenly distributed in the cathode proximity region of the first layer.

Comparative Example 2

A second layer containing an oxide of aluminum was formed between an aluminum framework and a first layer, and then an anode foil was sufficiently washed with pure water. Thereafter, the anode foil was cut into a predetermined shape.

Example 3

After a chemical conversion was formed on an aluminum foil having a first layer with ammonium adipate in the same manner as in Example 1A, phosphorus derived from phosphate ions was introduced as an additive element into a dielectric layer by further applying a voltage of 65 V for 5 minutes in an ammonium phosphate aqueous solution (ammonium phosphate concentration: 0.005 mass %). Thereafter, an anode foil was heated in air at 250° C. for 15 minutes, and then the anode foil was further cut into a predetermined shape.

As a result of elemental analysis by GD-OES, $Ta_2O_5$ was contained in the first layer (thickness: about 80 nm), and $Al_2O_3$ was contained in the second layer (thickness: about 10 nm) (T1=8×T2).

A maximum concentration of phosphorus (P) as the additive element between depth D1 of 0.05×T1 from the outer surface of the first layer at a side opposite to the metal framework and depth D2 of 0.3×T1 from the outer surface of the first layer at a side opposite to the metal framework was eleven times or more the concentration of phosphorus (P) at depth D3 of 0.75×T1 from the surface of the first layer at the cathode part side.

Figure 8:
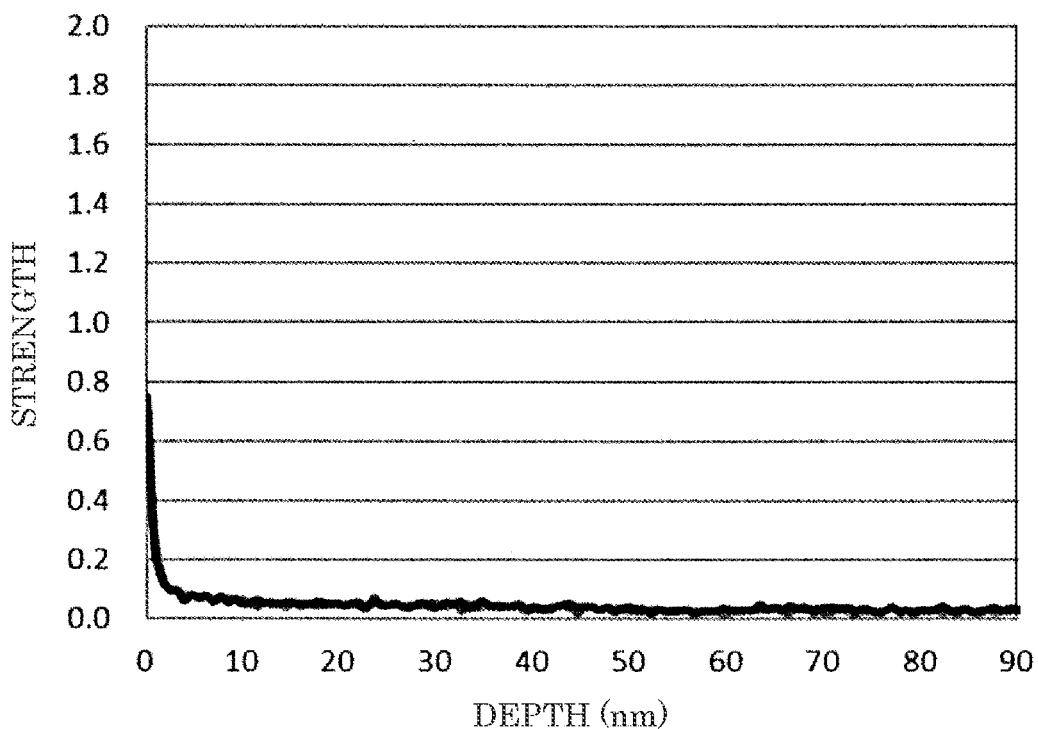
FIG. 8 is a graph showing a relationship between a distance from an outer surface and a content of phosphorus as an additive element in a dielectric layer according to Example 3 of the present disclosure.

FIG. 8 represents a relationship between a distance (depth) from the surface of the first layer at the cathode part side and a content of a phosphorus element. It can be confirmed that the phosphorus element is unevenly distributed in the cathode proximity region of the first layer. The elements of nitrogen and carbon were confirmed in the same manner as in FIGS. 5 and 6.

Comparative Example 3

A second layer containing an oxide of aluminum was formed between an aluminum framework and a first layer, and then an anode foil was sufficiently washed with pure water. Thereafter, the anode foil was cut into a predetermined shape.

TABLE 1

| | Electrostatic capacitance | Leak current | Acid resistance (leak current) |
|---|---|---|---|
| Example 1A | 104% | 90% | 95% |
| Example 1B | 104% | 87% | 89% |
| Comparative Example 1 | 100% | 100% | 100% |
| Example 2 | 103% | 92% | 87% |
| Comparative Example 2 | 99% | 100% | 100% |
| Example 3 | 105% | 85% | 89% |
| Comparative Example 3 | 101% | 100% | 100% |

In Examples 1, 2, and 3, the electrostatic capacitance was improved as compared with Comparative Examples 1, 2, and 3. It is considered that this is because crystallization of the dielectric layer was promoted by a heat treatment. On the other hand, when the crystallization of the dielectric layer is promoted, the leakage current may be increased, but in Examples 1, 2, and 3, the leakage current was reduced by the additive element and the acid resistance was improved as compared with Comparative Examples 1, 2, and 3. As the retention time in the chemical conversion become longer, the leakage current was further reduced, and the acid resistance was further improved.

According to the present disclosure, it is possible to obtain an electrolytic capacitor having high acid resistance and a leakage current of electrolytic capacitor can be sufficiently reduced.

What is claimed is:

1. An electrode foil for an electrolytic capacitor, the electrode foil comprising:
   a metal foil having a porous part; and
   a dielectric layer covering a surface of a metal framework constituting the porous part, wherein:
   the dielectric layer includes a first layer containing an oxide of a second metal different from a first metal contained in the metal framework, the first layer having a thickness T1,
   the first layer contains at least one kind of additive element selected from the group consisting of carbon, phosphorus, boron, and nitrogen,
   the first layer has an inner surface and an outer surface, the inner surface facing the metal framework, the outer surface being opposite to the inner surface,
   the at least one kind of additive element is contained in a region from the outer surface of the first layer to a depth of at least 0.05×T1,
   the first layer includes a first region and a second region, the first region being from the outer surface to a center of the first layer in a thickness direction, the second region being from the center to the inner surface, and
   a content of the at least one kind of additive element in the first region is greater than a content of the at least one kind of additive element in the second region.

2. The electrode foil according to claim 1, wherein, in the first region, a maximum concentration of the at least one kind of additive element in a region between a depth D1 and a depth D2 is twice or more a concentration of the at least one kind of additive element at a depth D3, the depth D1 being 0.05×T1 from the outer surface of the first layer, the depth D2 being 0.3×T1 from the outer surface of the first layer, the depth D3 being 0.75×T1 from the outer surface of the first layer.

3. The electrode foil according to claim 1, wherein, in the first region, a maximum concentration of the at least one kind of additive element in a region between a depth D1 and a depth D2 is three times or more a concentration of the at least one kind of additive element at a depth D3, the depth D1 being 0.05×T1 from the outer surface of the first layer, the depth D2 being 0.3×T1 from the outer surface of the first layer, the depth D3 being 0.75×T1 from the outer surface of the first layer.

4. The electrode foil according to claim 1, further comprising a second layer containing an oxide of the first metal and disposed between the metal framework and the first layer, the second layer having a thickness T2,
   wherein T1 and T2 satisfy a following relationship, $$T1 \geq 2 \times T2.$$

5. The electrode foil according to claim 1, wherein:
   the first metal contains aluminum, and
   the second metal contains at least one kind selected from the group consisting of tantalum, niobium, titanium, silicon, zirconium, and hafnium.

6. An electrolytic capacitor comprising:
   an anode body having a porous part;
   a dielectric layer covering a surface of a metal framework constituting the porous part; and
   a cathode part covering the dielectric layer, wherein:
   the dielectric layer includes a first layer containing an oxide of a second metal different from a first metal contained in the metal framework, the first layer having a thickness T1,
   the first layer contains at least one kind of additive element selected from the group consisting of carbon, phosphorus, boron, and nitrogen,
   the first layer has an inner surface and an outer surface, the inner surface facing the metal framework, the outer surface facing the cathode part,
   the at least one kind of additive element is contained in a region from the outer surface of the first layer to a depth of at least 0.05×T1,
   the first layer includes a first region and a second region, the first region being from the outer surface to a center of the first layer in a thickness direction, the second region being from the center to the inner surface, and
   a content of the at least one kind of additive element in the first region is greater than a content of the at least one kind of additive element in the second region.

7. The electrolytic capacitor according to claim 6, wherein, in the first region, a maximum concentration of the at least one kind of additive element in a region between a depth D1 and a depth D2 is twice or more a concentration of the at least one kind of additive element at a depth D3, the depth D1 being 0.05×T1 from the outer surface of the first layer, the depth D2 being 0.3×T1 from the outer surface of the first layer, the depth D3 being 0.75×T1 from the outer surface of the first layer.

8. The electrolytic capacitor according to claim 6, wherein, in the first region, a maximum concentration of the at least one kind of additive element in a region between a depth D1 and a depth D2 is three times or more a concentration of the at least one kind of additive element at a depth D3, the depth D1 being 0.05×T1 from the outer surface of the first layer, the depth D2 being 0.3×T1 from the outer surface of the first layer, the depth D3 being 0.75×T1 from the outer surface of the first layer.

9. The electrolytic capacitor according to claim 6, further comprising a second layer containing an oxide of the first metal and disposed between the metal framework and the first layer, the second layer having a thickness T2,
   wherein T1 and T2 satisfy a following relationship, $$T1 \geq 2 \times T2.$$

10. The electrolytic capacitor according to claim 6, wherein
the first metal contains aluminum, and
the second metal contains at least one kind selected from the group consisting of tantalum, niobium, titanium, silicon, zirconium, and hafnium.

* * * * *